United States Patent [19]

Lundin

[11] Patent Number: 4,761,578
[45] Date of Patent: Aug. 2, 1988

[54] METHOD AND MEANS FOR OPERATING BRUSHLESS DC MOTOR WITH REVERSIBLE DC POWER

[75] Inventor: Robert S. Lundin, Northfield, Conn.

[73] Assignee: The Superior Electric Company, Bristol, Conn.

[21] Appl. No.: 19,818

[22] Filed: Feb. 27, 1987

[51] Int. Cl.⁴ .................. H02P 7/10; H02K 11/00
[52] U.S. Cl. ....................... 310/68 B; 318/293; 318/739
[58] Field of Search .......... 307/127; 310/68 R, 68 A, 310/68 B, 68 C, 177, 180; 318/280, 739, 749, 293; 361/30, 33, 84, 85, 86, 245, 246; 363/63

[56] References Cited

U.S. PATENT DOCUMENTS

| | | | |
|---|---|---|---|
| 1,805,160 | 5/1931 | Bivens | 318/293 |
| 3,484,672 | 12/1969 | Bailey | 318/293 |
| 4,406,979 | 9/1983 | Sloan | 361/33 |
| 4,494,181 | 1/1985 | Ramlohr et al. | 363/63 |

Primary Examiner—Patrick R. Salce
Assistant Examiner—D. L. Rebsch
Attorney, Agent, or Firm—John H. Crozier

[57] ABSTRACT

A circuit for operating a brushless DC motor, the circuit receiving as inputs the positive/negative, or negative/positive DC power normally applied to reverse a brush-type DC motor, with the polarity of the input power determining direction of rotation of the motor. The input power is full-wave rectified to provide positive/negative DC power to the brushless DC motor drive. A polarity sense circuit determines the polarity of the input DC power and provides to the brushless DC motor drive a logic signal indicating commanded direction.

4 Claims, 1 Drawing Sheet

METHOD AND MEANS FOR OPERATING BRUSHLESS DC MOTOR WITH REVERSIBLE DC POWER

BACKGROUND OF THE INVENTION

1. Technical Field

This invention relates to means for driving a brushless D.C. motor, and more particularly to novel means that provide for reversing a D.C. motor using reversible D.C. power such that a brushless D.C. motor may be substituted for a brush-type D.C. motor without changing the means used to control direction of rotation.

2 Background Art

In a brush-type D.C. motor, the field is produced by permanent magnets and is generally stationary, that is, it is located in the stator. The rotor has wound on it windings which are connected to a commutator comprising bars which are sequentially connected to the windings. Brushes which contact the commutator bars are so positioned that the appropriate winding is energized when the rotor has moved to a position such that peak torque will be developed by the interaction of the current in the winding and the permanent magnet field. It is clear that, with such a motor, reversal of the polarity of the applied power will result in a reversal of the rotation of the rotor.

In the case of a brushless D.C. motor, the stator generally is the portion of the motor that includes the windings and the permanent magnet is located in the rotor. This is done for various practical reasons, the most important of which is to enable the leads to be brought out from the motor without going through a commutator, thus a "brushless" D.C. motor. In such a case, the windings are energized sequentially by commutation means which usually consists of a solid state switching circuit, the solid state switches being triggered to the conducting state in a sequential pattern in accordance with the location of the rotor with respect to the stator windings and the desired direction of rotation. Reversing the polarity of the supply voltage would not cause such a motor to reverse; indeed, it would only damage the semiconductor switches because they are unipolar in character. It is therefore necessary to provide for reversal of the motor by a different means and the only means that is known at the present is to change the sequence of winding energization.

The sequence of winding energization is governed by a permanently memorized pattern that is imprinted on a PROM (or its equivalent in discrete components) and the sequence is then governed by the PROM's calling for one switch after the other to be energized. When it is desired to reverse the direction of rotation, it is necessary to command the PROM to determine which of the two sequences it will call on for the switching. To do this, a logical "one" or a logical "zero" command is applied to the portion of the logic circuit that controls the PROM to enable the PROM to apply one of the sequences.

In general, then, direction of rotation of a brush-type D.C. motor is determined by the polarity of the applied power, while direction of rotation of a brushless D.C. motor is determined by a command to a logic circuit, the brushless D.C. motor drive receiving only unidirectional power. It would be desirable in some cases, generally for retrofit purposes, to be able to substitute a brushless D.C. motor for a brush-type D.C. motor in a given application and have the direction of rotation of the brushless D.C. motor be determined by the polarity of the applied power.

SUMMARY OF THE INVENTION

The present invention enables the substitution of a brushless D.C. motor for a brush-type motor, with the direction of rotation of the brushless D.C. motor being determined by the polarity of the applied power, by providing a circuit which furnishes unidirectional power to the brushless D.C. motor drive from a bidirectional power source and generates a direction command signal to the drive which depends upon the polarity of the applied power.

DETAILED DESCRIPTION OF THE INVENTION

Figure 1:
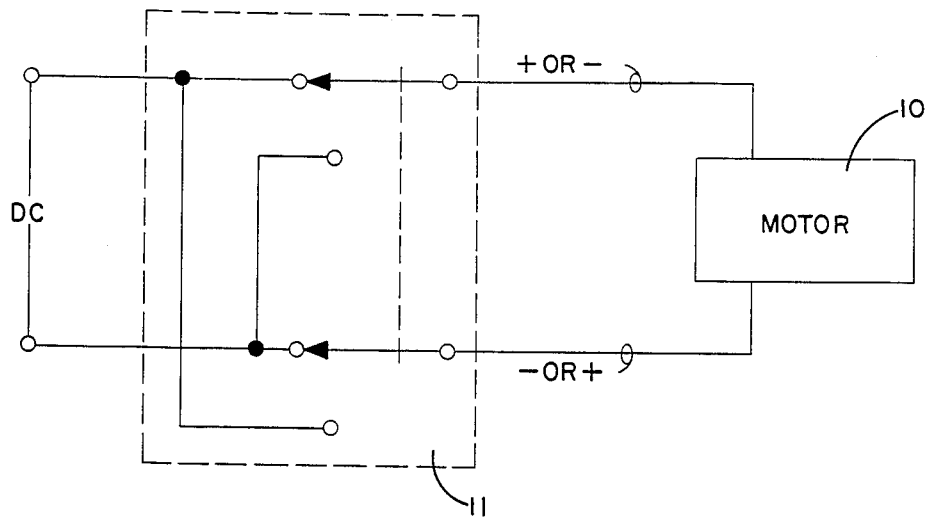
FIG. 1 is a schematic/block diagram of a conventional drive system with a brush-type D.C. motor.

Referring to the Drawing, FIG. 1 shows a conventional drive system with a brush-type D.C. motor, which comprises the motor 10, and a reversing switch 11 adapted to be connected to a source of D.C. power, with the motor 10 and the reversing switch 11 connected as shown. In operation, the reversing switch provides either +/− or −/+ power to the motor, thus causing the motor to provide rotation in one direction or the other.

Figure 2:
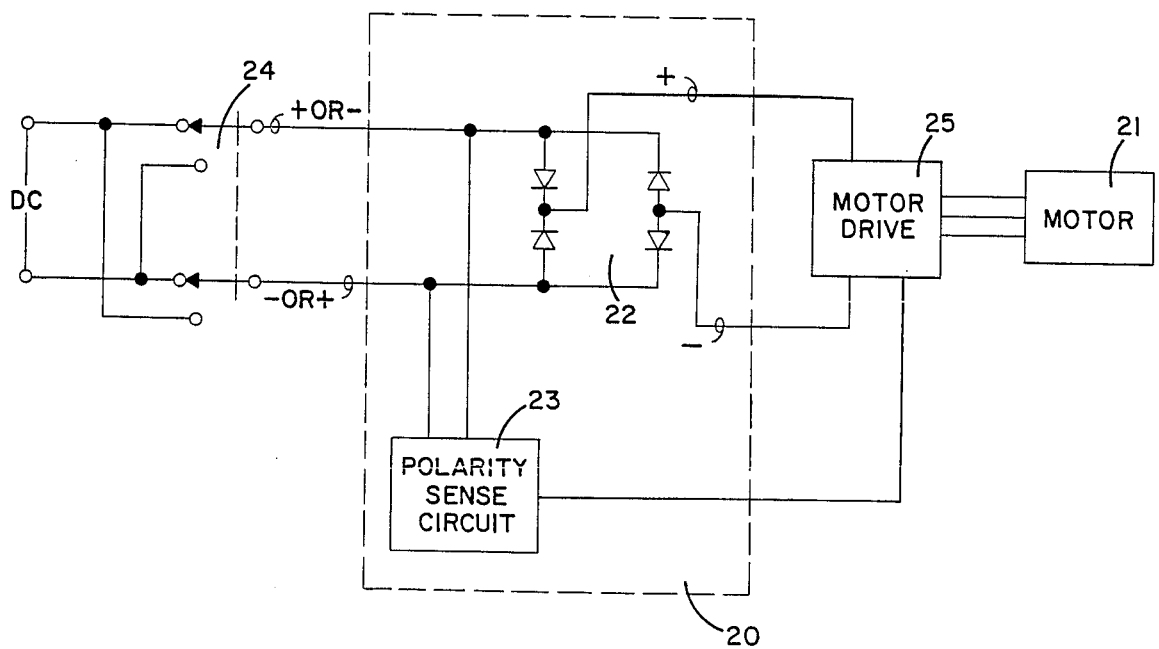
FIG. 2 is a schematic/block diagram of the drive system of the present invention with a brushless D.C. motor.

FIG. 2 shows a circuit 20 according to the present invention, which permits a brushless D.C. motor 21 to be substituted for a brush-type D.C. motor, which circuit comprises a full-wave rectifier 22 and a polarity sense circuit 23 connected as shown. Inputs to the full-wave rectifier 22 are from a reversing switch 24 adapted to be connected to a D.C. source of power, which may be assumed to be part of a conventional drive system for a brush-type D.C. motor, as described with reference to FIG. 1. Outputs from the circuit 20 provide inputs to a conventional motor drive 25 which provides commutation to the motor 21.

In operation, the reversing switch 24 produces either +/− or −/+ power, as if driving a brush-type D.C. motor. The full-wave rectifier 22 receives the +/− or −/+ power from the reversing switch 24 and furnishes unidirectional outputs to the motor drive 25, regardless of the polarity of the power received by the full-wave rectifier. The motor drive 25 is connected to commutate the windings in the brushless D.C. motor 21. The polarity sense circuit 23 determines the polarity of the output of the reversing switch 24 and provides the necessary logic command to the motor drive 25 to commutate the windings in the brushless D.C. motor 21, to produce rotation of the motor in one direction or the other, depending on the polarity of the output of the reversing switch 24.

It will be understood that what has been disclosed is a novel means for permitting the substitution of a brushless D.C. motor for a brush-type D.C. motor, while having the direction of rotation of the brushless D.C. motor be determined by the polarity of the applied power.

Since certain changes may be made in carrying out the above invention without departing from the scope thereof, it is intended that all matter contained in the above description or shown in the accompanying Drawing shall be interpreted as illustrative and not in a limiting sense.

It is also intended that the following claims are intended to cover all of the generic and specific features of the invention herein described, and all statements of the scope of the invention which, as a matter of language, might be said to fall therebetween.

I claim:

1. A circuit for providing direction information and power to a brushless D.C. motor drive, the circuit receiving as inputs positive/negative or negative/positive D.C. power, the polarity of the input D.C. power indicating commanded direction of rotation of the motor, comprising:
   (a) means for receiving the positive/negative or negative/positive input D.C. power and providing only positive/negative D.C. power to the motor drive regardless of the polarity of the D.C. power received; and
   (b) means for determining the polarity of the input D.C. power and providing to the motor drive a logic signal indicating the commanded direction of rotation of the motor.

2. The circuit, as defined in claim 1, wherein element (a) comprises a full-wave rectifier.

3. A method of providing direction information and power to a brushless D.C. motor drive from input positive/negative or negative/positive D.C. power, the polarity of the input power indicating commanded direction of rotation of the motor, comprising:
   (a) receiving the positive/negative or negative/positive input power;
   (b) providing to the motor drive only positive/negative D.C. power regardless of the polarity of the D.C. power received;
   (c) determining the polarity of the input D.C. power; and
   (d) providing to the motor drive a logic signal indicating commanded direction of rotation of the motor.

4. A brushless D.C. motor system, comprising:
   (a) reversing means connected to a unidirectional source of power such that the reversing means can provide either a positive/ negative or a negative/positive polarity power output depending on which direction the motor is to rotate;
   (b) rectifying means to receive the output of the reversing means and provide only a positive/negative output regardless of the polarity of the output of the reversing means;
   (c) motor drive means which receives the output of the rectifying means and energizes the windings of the brushless D.C. motor according to one of two sequences of energization; and
   (d) polarity sense means to determine the polarity of the output of the reversing means and to command the motor drive means to select a particular one of the two sequences of energization; such that when the output of the reversing means is one polarity, the motor will rotate in one direction, and, when the output of the reversing means is the opposite polarity, the motor will rotate in the opposite direction.

* * * * *